Feb. 6, 1968   D. G. DUVALL   3,367,202
FEED SCREW NUT FOR THE KNIFE CARRIAGE OF A VENEER LATHE
Filed Sept. 28, 1966   2 Sheets-Sheet 1

Delbert G. Duvall
INVENTOR.

Feb. 6, 1968    D. G. DUVALL    3,367,202

FEED SCREW NUT FOR THE KNIFE CARRIAGE OF A VENEER LATHE

Filed Sept. 28, 1966    2 Sheets-Sheet 2

Delbert G. Duvall
INVENTOR.

BY Clarence A. O'Brien
and Harvey B. Jacobson
Attorneys

United States Patent Office 3,367,202
Patented Feb. 6, 1968

3,367,202
FEED SCREW NUT FOR THE KNIFE CARRIAGE
OF A VENEER LATHE
Delbert G. Duvall, Gold Beach, Oreg., assignor of fifty
percent to Curtis R Duvall, Gold Beach, Oreg.
Filed Sept. 28, 1966, Ser. No. 582,708
10 Claims. (Cl. 74—459)

This invention generally appertains to improvements in screw-type feeding means and more particularly relates to a novel feed screw nut and feed screw means, especially for use with the slidable knife carriage of a veneer lathe for peeling logs into veneer.

Veneer lathes are employed in the plywood industry for peeling small logs into veneer. Such veneer lathes have feed screws in structural association with the knife carriage of the lathe that slides or moves the carriage into the log as the log is being revolved by the lathe.

Such lathes are of a high speed design, particularly when handling small logs, such as small pine logs. In order to obtain enough veneer footage through such veneer lathe it is necessary that a considerably large number of logs be peeled through the veneer lathe. This means that the knife carriage on the veneer lathe must be moved backwards and forwards by means of a feed screw and nut arrangement many thousand numbers of times in one day's operation.

Known veneer lathes employ brass feed screw nuts which are attached to the knife carriage and which are threadingly engaged by steel feed screws. Such brass nuts wear very fast and have a tendency to acquire small grooves on their threads which in turn form small grooves on the steel feed screw, consequently causing the steel feed screw to wear excessively. On such high speed veneer lathes, a set of feed screws and nuts wear out in two to four months.

An important object of the present invention is to provide a novel feed screw nut, particularly for use with a steel feed screw in association with the movable knife carriage of a veneer lathe for peeling logs into veneer, which will not be subject to the foregoing stated defects of conventionally used feed screw nuts in that it will not groove and will not damage the threads on a steel feed screw and, in actuality, will polish and service them, thereby considerably lengthening the life of the steel feed screw. In addition, it has been found that only half the thrust need be exerted on the threads. Consequently, the feed screw nuts, constructed in accordance with the present invention, will last for a considerably longer period than conventional feed screw nuts.

Therefore, another important object of the present invention is to provide an economical, efficient and effective feed screw nut for use with a steel feed screw, particularly though not restrictively, in association with the movable knife carriage of a veneer lathe for peeling logs into veneer.

A meritorious feature of the present invention resides in the provision of a steel sleeve, which is provided with a liner of babbit metal fixed in said sleeve with interlocking means between the liner and the inner surface of the sleeve to locate the liner against axial and rotational displacement and movement within the sleeve and the liner being internally threaded to threadingly receive in a positive screw-threaded engagement a steel feed screw.

Another object of the present invention is to provide in combination with the slidable knife carriage of a veneer lathe for peeling logs into veneer feed screw means for moving the carriage relative to the logs, which are rotatably carried by the veneer lathe, the feed screw means comprising a steel feed screw and a steel sleeve having a means for mounting it on the carriage and having a liner of babbit metal fixedly secured therein against any movement relative thereto and the liner having an internally threaded surface threadingly receiving the steel feed screw in a positive screw-threaded engagement.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
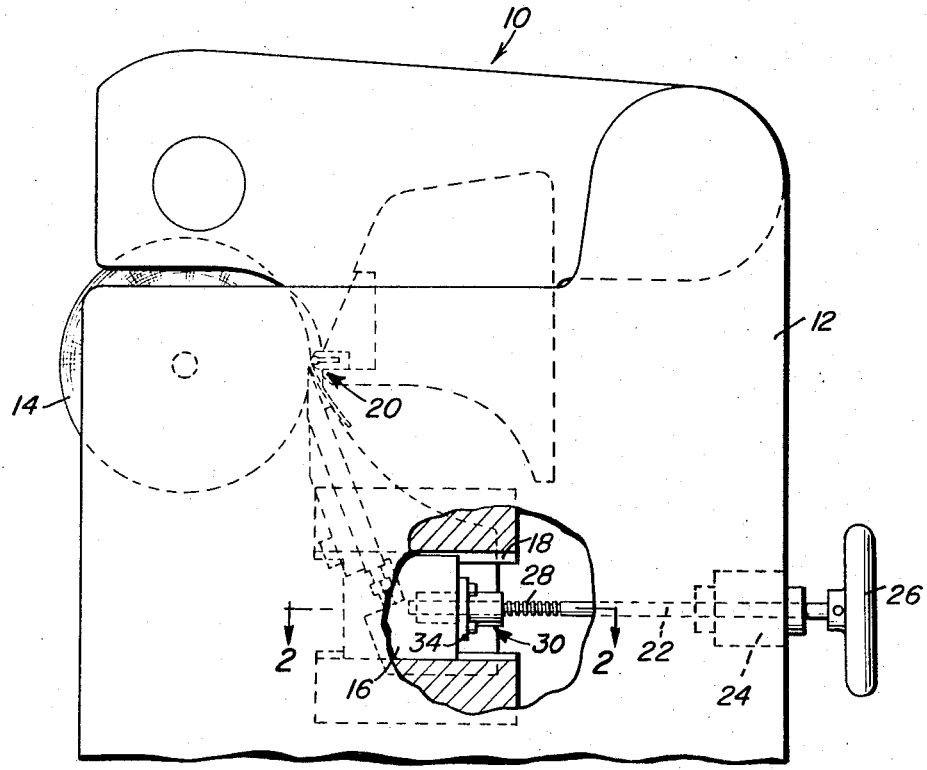
FIGURE 1 is a fragmentary elevational view of a veneer lathe, showing in elevation the feed carriage, which is moved relative to the log revolved by the lathe under the action of feed screw means constructed in accordance with the present invention.
Figure 2:
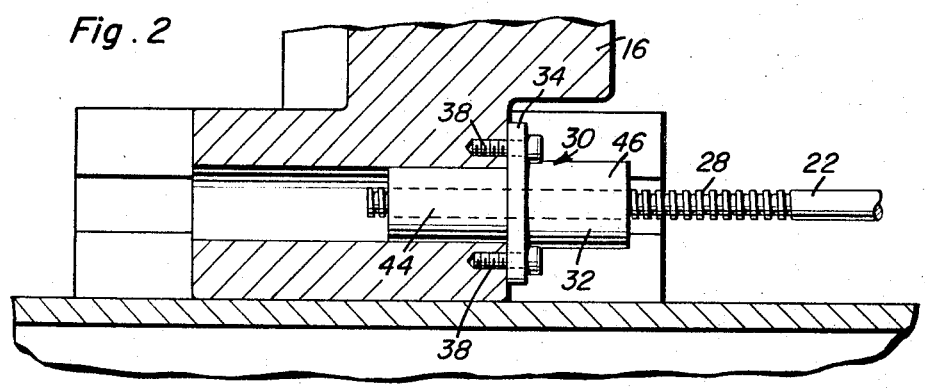
FIGURE 2 is a longitudinal, detailed sectional view, taken substantially on line 2—2 of FIGURE 1.

Referring now more particularly to the accompanying drawings, and initially to FIGURES 1 and 2, the reference numeral 10 generally designates a conventional veneer lathe, which has a frame structure 12 and which is adapted through chuck means or the like (not shown) to hold and rotate a log 14.

A knife carriage 16 is slidably disposed in a slideway 18 for movement relative to and from the log, carrying the knife means 20 into peeling engagement with the log 14. The carriage 16 is moved to and fro in the slideway 18 by an elongated steel feed screw 22, which has an outer end portion carried by and disposed within a conventional support 24, the outer end portion of the screw rod terminating in a handwheel 26. The inner end portion 28, which is exteriorly threaded, is adapted to threadingly engage a feed screw nut 30, which is constructed in accordance with the present invention.

As aforestated, it is conventional with such veneer lathes to use brass feed screw nuts which are about nine inches in length. However, these brass nuts wear out very fast and have a tendency to acquire small grooves on their threads which cause small grooves to be formed on the threaded end portion 28 of the steel feed screw causing the steel feed screw to wear excessively. Obviously, the knife carriage 16 must be screwed backwards and forwards thousands of times in one day, when the veneer lathe is operating on small pine logs in peeling such small logs into veneer, which is used for making plywood. Consequently, it has been found that a set of feed screws and nuts of conventional construction wear out in approximately two to four months. This necessitates replacement of such parts, which is not only costly, insofar as the cost of the parts and labor for replacement but also is costly in that the lathe is out of operation for a considerable period of time. Such factors are obviated by the feed screw nut 30 of the present invention.

Figure 3:
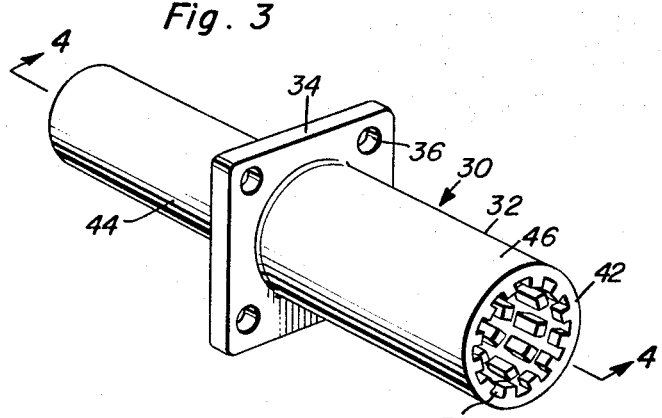
FIGURE 3 is a perspective view of the external portion of the feed screw nut of the present invention.
Figure 4:
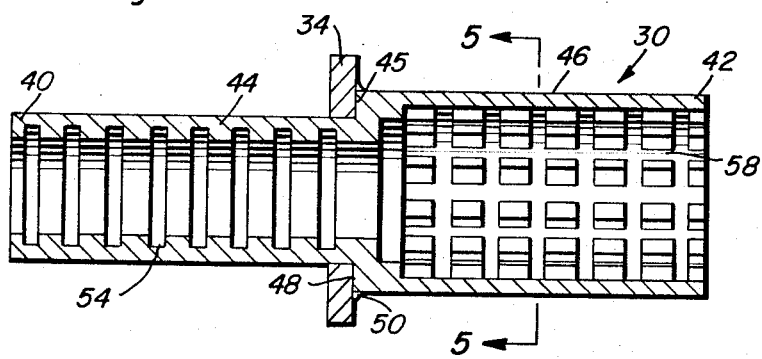
FIGURE 4 is a longitudinal sectional view taken substantially on line 4—4 of FIGURE 3.
Figure 5:
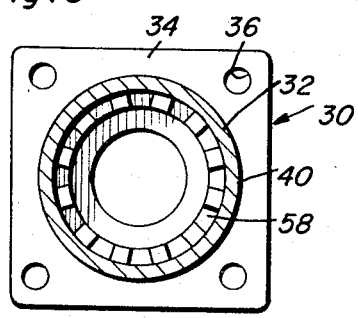
FIGURE 5 is a transverse sectional view, taken substantially on line 5—5 of FIGURE 4.

The feed screw nut 30 is shown more particularly in FIGURES 3–5. The feed screw nut 30 comprises a steel sleeve 32, which is formed with a laterally extending mounting flange 34. The flange 34 may be of any configuration, but as shown, is substantially rectangular and is provided adjacent its corners with apertures 36, which are adapted to receive fasteners 38, as shown in FIGURE 2, so as to mount the feed screw nut 30 on the carriage 16, in relationship thereto as shown in FIGURES 1 and 2.

The mounting flange 34 is preferably disposed midway the opposing ends 40 and 42 of the sleeve. The sleeve is formed in two sections 44 and 46, respectively, the sleeve being of one piece steel construction. The section 44 is coaxially reduced so as to provide a radially extending, exterior shoulder 45, against which the mounting flange 34 abuts, the flange being secured to the inner end of the larger diameter section 46 by welding, soldering or the like, as indicated at 50.

The steel sleeve is provided with a liner 52 formed of babbit metal, which is fixed in the sleeve against any movement relative to the sleeve and which is coextensive in length with the sleeve.

Interlocking means is provided between the liner 52 and the inner surface of the sleeve to locate the liner against axial and rotational displacement within the sleeve so that the liner cannot move axially of the sleeve under the end thrust of the threaded end portion 28 of the feed screw in the rotation of the feed screw portion 28 within the liner and so that the liner cannot rotate within the sleeve as the feed screw 22 is rotated in the liner.

Figure 6:
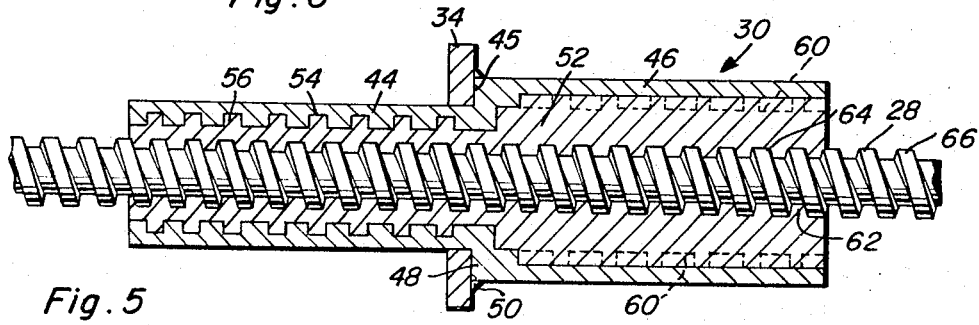
FIGURE 6 is a longitudinal sectional view of the complete feed screw means, including the complete feed screw nut assembly and the feed screw, showing the feed screw threadingly disposed in the feed screw nut.

The interlocking means includes the provision of annular grooves 54 formed in axially spaced relation within the inner surface of the section 44 and the liner 52 has annular ribs 56 which fit snugly and tightly within the grooves, as shown in FIGURE 6, so that the liner is held against axial displacement within the steel sleeve. In addition, the interlocking means includes the provision in the inner surface of the sleeve section 46 of axial grooves 58, which receive axial ribs or lugs 60, as shown in FIGURE 6, on the outer surface of the liner 52.

Therefore, the interlocking means includes the provision of the annular grooves 54 and the axial grooves 58, the latter being spaced circumferentially of the inner surface of the section 46 of the sleeve, and the provision of the annular ribs 56 and axial ribs or lugs 60 on the outer surface of the liner 52. By virtue of such annular and axial grooves on the inner surface of the sleeve 32 and the corresponding and complemental annular ribs 56 and axial ribs 60 on the liner, the interlocking means is realized.

The liner is formed with a centrally disposed threaded bore 62, which is disposed coaxially of the liner and the sleeve and extends centrally through the liner. As shown in FIGURE 6, the bore 62 is formed with threads 64 which are identically matched with the threads 66 of the threaded portion 28 of the steel feed screw so as to mesh in a positive screw-threaded engagement with the threads 66. Thus, the threads 66 of the threaded end portion 28 of the feed screw smoothly and effortlessly engage the threads 64 in the bore 62 of the liner.

The threaded bore 62 of the liner 52, which receives the threaded end portion 28 of the feed screw, actually polishes the threads 66 of the threaded portion 28, thereby considerably increasing the longevity of the steel feed screw.

It is to be noted that the flange 34 bears against the shoulder 48 so that the flange, when mounted by the fasteners 38 on the carriage 16, as shown in FIGURE 2, will be reinforced by the shoulder in a forward thrust of the feed screw and consequent forward movements of the carriage 16.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with the slidable knife carriage of a veneer lathe for peeling logs into veneer; feed screw means operatively connected to the carriage for moving the knife carriage relative to logs rotatably carried by the veneer lathe, said feed screw means comprising a steel sleeve, means for mounting the sleeve on the carriage, a steel feed screw coaxially disposed in said sleeve, a liner of babbit metal in said sleeve, means for securing said liner in the sleeve against any movement relative to the sleeve and said liner having an internally threaded surface threadingly receiving the steel feed screw in a positive screw-threaded engagement and defining a feed screw nut in conjunction with the steel sleeve.

2. The invention of claim 1, wherein said liner is coextensive in length with the sleeve.

3. The invention of claim 1, wherein said means for mounting the sleeve on the carriage includes an exteriorly disposed and laterally extending mounting flange secured on the sleeve.

4. The invention of claim 3, wherein said flange is positioned substantially midway of the ends of the sleeve.

5. The invention of claim 1, wherein said means securing the liner in the sleeve against any movement includes the provision of annular grooves in the interior surface of the sleeve and said liner having annular ribs fixed in said grooves so that the liner cannot move axially of the sleeve under the end thrust of the feed screw in its rotation within the liner.

6. The invention of claim 5, wherein said annular grooves and ribs are spaced axially of the combined sleeve and liner.

7. The invention of claim 1, wherein said means securing the liner in the sleeve against any movement includes the provision of axial grooves in the interior surface of the sleeve and said liner having axial ribs fixed in said axial grooves so that the liner cannot rotate within the sleeve as the feed screw is rotated in the sleeve.

8. The invention of claim 7, wherein said axial ribs and grooves are spaced circumferentially of the combined sleeve and liner.

9. The invention of claim 1, wherein said means for mounting the sleeve on the carriage includes a mounting flange laterally extending from the sleeve and disposed substantially centrally of the sleeve, said means for securing the liner in the sleeve against any movement relative to the sleeve including the sleeve having two sections on opposite sides of the mounting flange, the interior surface of the sleeve in one section being formed with axially spaced annular grooves and said liner having annular ribs fixed in said grooves, the interior surface of the sleeve in the other section being formed with axial circumferentially spaced grooves and said liner having axial ribs fixed in said axial grooves.

10. A feed screw nut for use with a steel feed screw in association with the movable knife carriage of a veneer lathe for peeling logs into veneer comprising a steel sleeve, a liner of babbit metal disposed in said sleeve and coextensive in length with the sleeve, and interlocking means between the liner and the inner surface of the sleeve to locate the liner against axial and rotational displacement within the sleeve, said liner being internally threaded to threadingly receive a steel feed screw.

References Cited

UNITED STATES PATENTS

| 2,240,087 | 4/1941 | Barrett | 74—459 |
| 2,370,245 | 2/1945 | Jacobsson et al. | 74—459 X |
| 2,441,580 | 5/1948 | Mageoch | 74—459 |

ROBERT M. WALKER, *Primary Examiner.*

LEONARD H. GERIN, *Examiner.*